April 16, 1957   J. T. PHILLIPS, JR   2,788,628
PEANUT COMBINE
Filed March 12, 1953   3 Sheets-Sheet 1

INVENTOR.
JOHN T. PHILLIPS JR.
BY
ATTORNEY

April 16, 1957  J. T. PHILLIPS, JR  2,788,628
PEANUT COMBINE

Filed March 12, 1953  3 Sheets-Sheet 2

INVENTOR.
JOHN T. PHILLIPS JR.
BY
ATTORNEY

April 16, 1957   J. T. PHILLIPS, JR   2,788,628
PEANUT COMBINE
Filed March 12, 1953   3 Sheets-Sheet 3
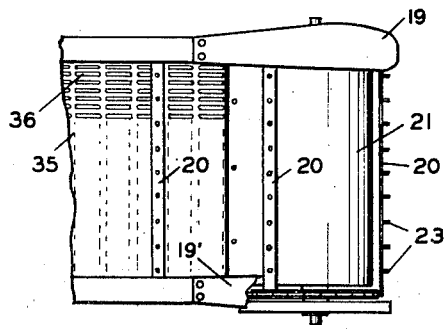
FIG 3
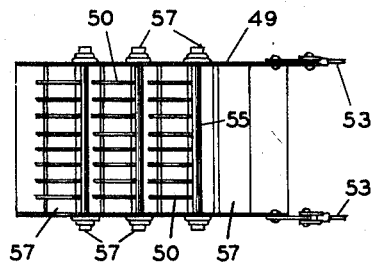
FIG 4
FIG 5
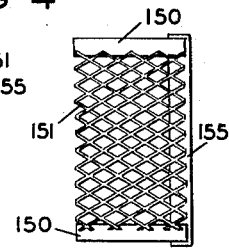
FIG 6
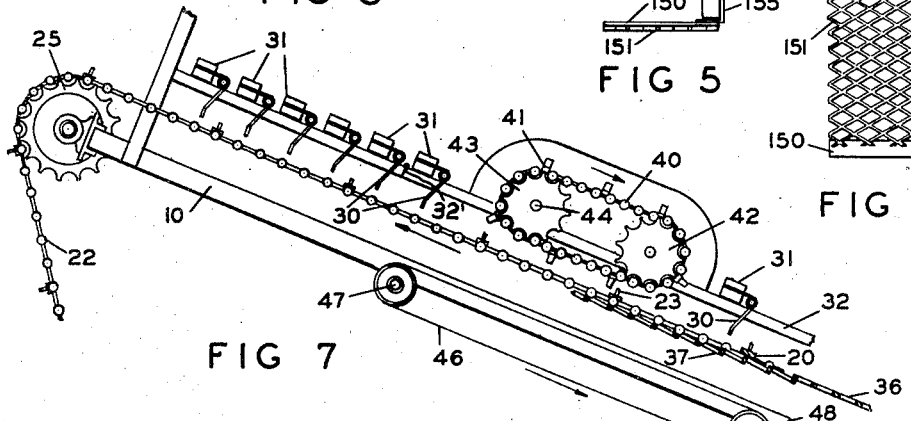
FIG 7
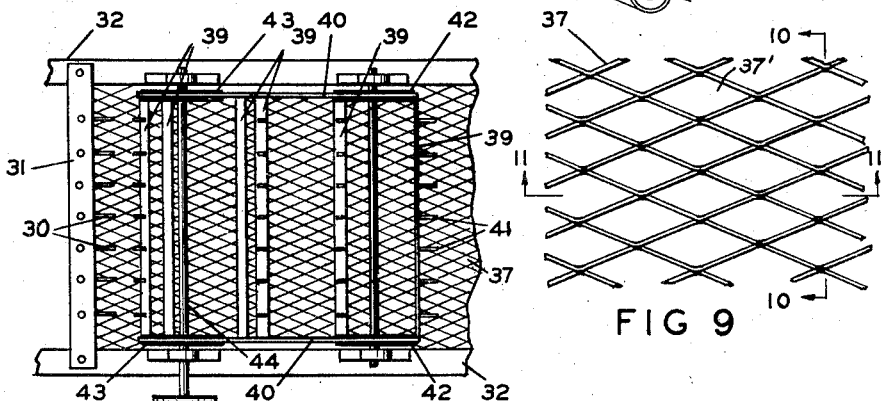
FIG 8    FIG 9
FIG 11    FIG 10
INVENTOR.
JOHN T. PHILLIPS JR.
BY
ATTORNEY

United States Patent Office 2,788,628
Patented Apr. 16, 1957

2,788,628
PEANUT COMBINE

John T. Phillips, Jr., Albany, Ga., assignor to Lilliston Implement Company, Albany, Ga., a corporation of Georgia Application March 12, 1953, Serial No. 341,899

19 Claims. (Cl. 56—19)

This invention relates to a peanut combine, and more particularly to a machine which will pick up, pick, separate from foreign materials, clean and sack peanuts from the windrow.

This invention constitutes an improvement over prior art peanut pickers and particularly that shown in U. S. Letters Patent No. 1,935,803 to which further reference is made, and this application is a continuation-in-part of my co-pending application, Serial No. 83,978, filed March 28, 1949, for a Peanut Combine and now abandoned.

In the operation of peanut combines, I have found certain disadvantages which the present invention will overcome. Specifically, in some instances, small pebbles and sand have been drawn over the nose-plate and onto the conveyor belt. Also, I have found that increased picking action is provided by the picker screen if this screen is manufactured of expanded metal in place of the flat screen previously used. Further, I have found that fewer peanuts are carried out with the hay mass, and greater efficiency is obtained from the picking screen if a mechanical agitator is incorporated with the picker mechanism.

I have also found it advisable to incorporate with my peanut combine hydraulic mechanism which will regulate the distance from the ground of the nose portion of this combine.

Accordingly, it is an object of my invention to provide an improved peanut combine which will more efficiently separate the peanuts from the stalk, stems, straw material and particles of dirt which may cling to this material.

Another object of my invention is to provide an improved peanut combine in which the agitator mechanism provides increased combing action necessary to remove a larger percentage of peanuts from their vines.

Another object of my invention is to provide an improved peanut combine which will continually pick up peanut laden vines and separate the peanuts from the remaining material and package these peanuts, substantially free from all foreign matter.

Another object of my invention is to provide a machine which is efficient in use either as a combine for picking up and threshing peanuts or as a stationary peanut picker.

Another object of my invention is to provide a machine which has advantages over the prior art peanut pickers, which is efficient in operation, economical in construction, and durable in use.

Other and further objects and advantages of my invention will become apparent from the following description when taken in conjunction with the accompanying drawings in which similar reference characters designate corresponding parts throughout the several views, and wherein:

Fig. 3 is a fragmentary top view of the nose portion of the machine illustrated in Fig. 1.

Fig. 4 is a detail top view showing the combined separator and stemmer hopper.

Fig. 5 is a detail side elevation showing an alternate arrangement of separator mechanism.

Fig. 6 is a bottom view of the detail shown in Fig. 5.

Fig. 7 is a fragmentary cross-sectional view showing the picker bars passing under the mechanical agitator mechanism and under part of the picker mechanism.

Fig. 8 is a fragmentary top view showing the details of the agitator mechanism shown in Fig. 7.

Fig. 9 is an enlarged fragmentary view of the picker screen.

Fig. 10 is an enlarged cross-sectional view taken along the line 10—10 in Fig. 9.

Fig. 11 is a cross-sectional view taken along line 11—11 in Fig. 9.

Figure 2:
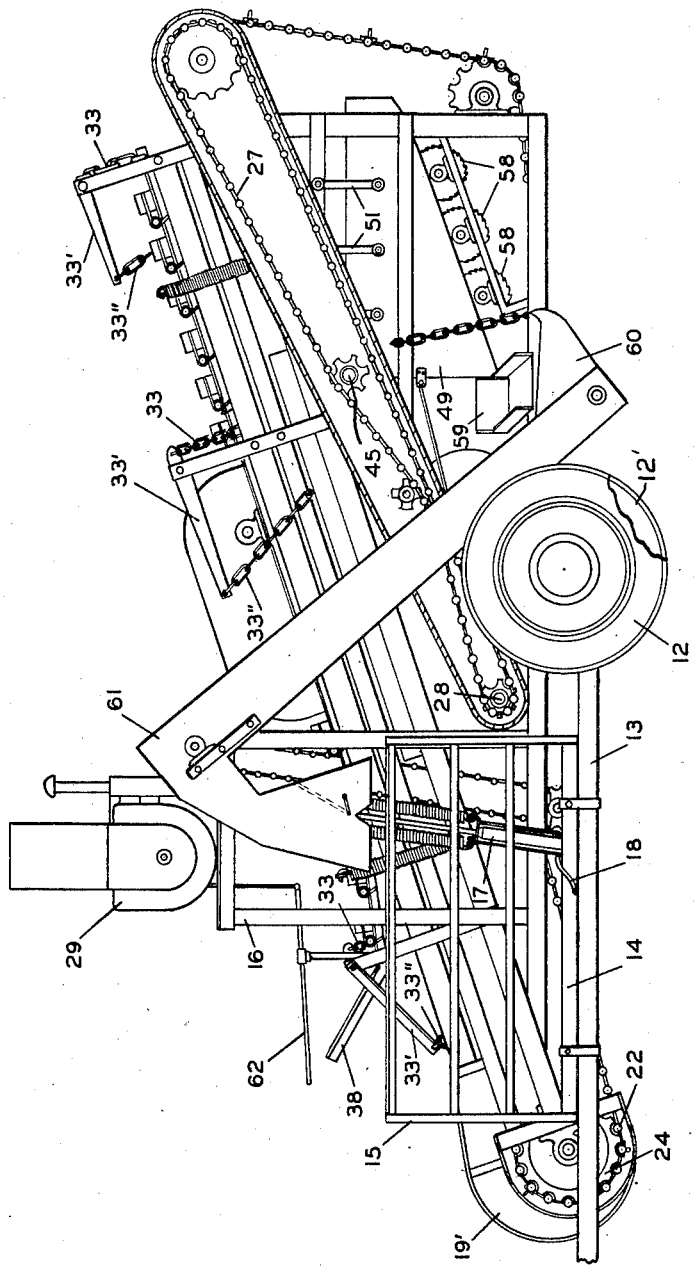
Fig. 2 is a side elevation, with parts in section, showing the opposite side of the machine shown in Fig. 1.

In the embodiment of my invention chosen for purpose of illustration, a substantially triangular frame 10 which supports the operating machinery is pivotally mounted upon a single axle 11 which is carried by wheels 12, 12'. A tongue 13 attached on the left side of frame 10 to axle 11, extends forwardly and is arranged for attachment to a draw bar (not shown) for pulling the combine. The tongue 13 also supports the operator's platform 14, shown in Fig. 2, having guard rails 15. A rectangular engine supporting frame 16 is fixed to and extends above triangular frame 10, and a hydraulic piston and cylinder 17 is located between platform 14 and supporting frame 16. Fluid is supplied to hydraulic cylinder 17 by hose connection 18 which leads from the tractor (not shown) and thus provides a means for adjustably supporting the front end of the combine a suitable distance above the ground so that nose portions 19, 19' clear the ground but remain sufficiently close to the ground to gather in the peanut laden vines after they have been dug and raked into windrows. The nose portions 19, 19' are spaced apart so as to straddle the windrow to be picked up, and serve to guide the peanut laden vines into the combine.

As the combine is pulled along the windrow, the vines are picked up off the ground and fed automatically into the combine by means of the picker bars 20 which extend transversely over the nose-plate 21 and have their ends carried by the picker chains 22, each picker bar being provided with a plurality of picker pins 23 to engage the vines and lift them onto the nose-plate 21. The picker chains 22 run over the picker chain idler sprockets 24, which are mounted on the lower front end of the frame 10 adjacent the nose of the combine, and over picker chain drive sprockets 25, which are mounted at the upper rear end of the frame on shaft 26 which is suitably connected by means of drive chain 27 to the main drive shaft 28 which is driven by a source of motive power such as the internal combustion engine 29 which is mounted on engine supporting frame 16. The drive connections are arranged so that the speed of the picker chains 22 will be slightly faster than the operating ground speed of the combine.

The peanut vines pass straight through the machine; and in the combine according to my invention they are conveyed the entire distance along a gradually upwardly inclined plane, thus combining the advantages of the straight passage and the upwardly inclined picker mechanism; whereby a more thorough combing of the peanuts from the vine is obtained, fewer peanuts are carried out with the hay mass, greater efficiency is obtained from the picking screen, fewer wearing parts are necessary and the natural and unrestricted travel of the continuous incline makes the machine more adaptable to the condition of the vines. The picker mechanism is constructed in such manner as to provide a self-feed for the vines, and comprises agitator spring fingers 30 which are mounted on cross bars 31 that are carried by angle bars 32, the whole comprising an adjustable spring table.

Each of angle bars 32 are divided into sections which are joined by hinges 32', thus transversely partitioning the spring table into joined segments, which are supported by chains 33 attached to lever mechanisms 33' which are pivoted on frame 10. Adjustable chains 33" join frame 10 and lever mechanism 33' so that the spring table may be adjustably positioned thereby, the downward motion of the spring table being limited by chains 33 and the upward motion of the spring table being resiliently resisted by springs 34.

As the vines are drawn beneath the spring table by the picker bars 20, the individual movement of the spring fingers 30 combs out the vines and causes agitation which loosens up the vines and permits peanuts to hang dependent therefrom. As the vines are drawn into the machine, they first pass over a dirt separator screen 35, shown in Fig. 3, which allows any loose dirt retained by the vines to drop through elongated apertures 36 and onto the ground. Separator screen 35 is bolted to nose-plate 21, as shown in Fig. 3, and is spaced down therefrom by a transverse spacer member 36' in Fig. 1 which provides a ledge or rest for peanuts that would otherwise roll over nose plate 21. These retained peanuts will later be swept by the incoming vines and carried into the machine. This dirt separator screen 35 extends substantially one-third the distance up the inclined plane of the machine and joins picker screen 37, as shown in Fig. 7, both screens lying beneath the spring table with picker screen 37 extending substantially the remainder of the distance up the inclined plane.

The front end of the spring table comprises an upwardly inclined end provided with a shield 38 which prevents vines from getting over on top of the spring table. This construction provides an automatic self-feed for the machine in that vines picked up by the picker bars 20 rounding the nose may be piled upon the extended portion of separator screen 35, and only the proper amount of vines will be carried through the machine by the picker bars 20 regardless of the amount of vines piled upon the forwardly extended portion of the separator screen 35.

The picker screen 37 comprises an expanded metal member having diamond-shaped openings 37' therethrough of sufficient size to permit the peanuts to drop through and hang pendent by ground stems attached to the vines as the vines are drawn under the spring fingers 30. The motion of the upper run of picker bars 20 over the picker screen 37 drags the vines up the incline, and the ground stems pull the pendent peanuts into the apex of the diamond-shaped openings so that the peanuts are caught beneath the screen. As shown in Figs. 9, 10 and 11, picker screen 37 according to my invention is made of expanded metal having the apex of each diamond-shaped opening formed by overlapping sections of the screen material, thus providing both shearing and breaking action on the ground stems of the pendent peanuts. To increase this shearing action of picker screen 37, the individual strands thereof may be of rectangular cross-sectional shape. As seen most clearly in Figs. 10 and 11 informing the overlapping sections, each strand may be transversely inclined from the plane of the screen material in staggered parallel arrangement so that each strand is on the same plane with each other strand in longitudinal alignment therewith. It is particularly pointed out that increased shearing or breaking action on the ground stems is also accomplished by allowing picker bars 20 to ride against the top of picker screen 37, as seen in Fig. 7.

It should be noted that the size of the diamond-shaped opening is an important feature of my invention since a larger size screen is necessary for large peanuts. Normally a No. 9—1½" unflattened expanded metal screen is used, which has openings, approximately 2⅟₁₆" long and 1⅛" wide. The large size screen found necessary in some instances is a No. 9—2" unflattened expanded metal screen and has opening approximately 3⅜" long and 1¹¹⁄₁₆" wide.

The small screen is for Spanish and runner peanuts while the large screen is for such peanuts as Virginia varieties. It is to be remembered that it is not advisable to use the large screen for small peanuts since it usually necessitates the reduction of speed of the machine below practical and economical limits and it is to be expected that a greater amount of foreign material will be carried into the machine with the separated peanuts. However, the large screen can be used to advantage on semi-green runner peanuts. On the other hand, if a small screen is used with large peanuts, the screen tends to damage a large percentage of the large peanuts.

Figure 1:
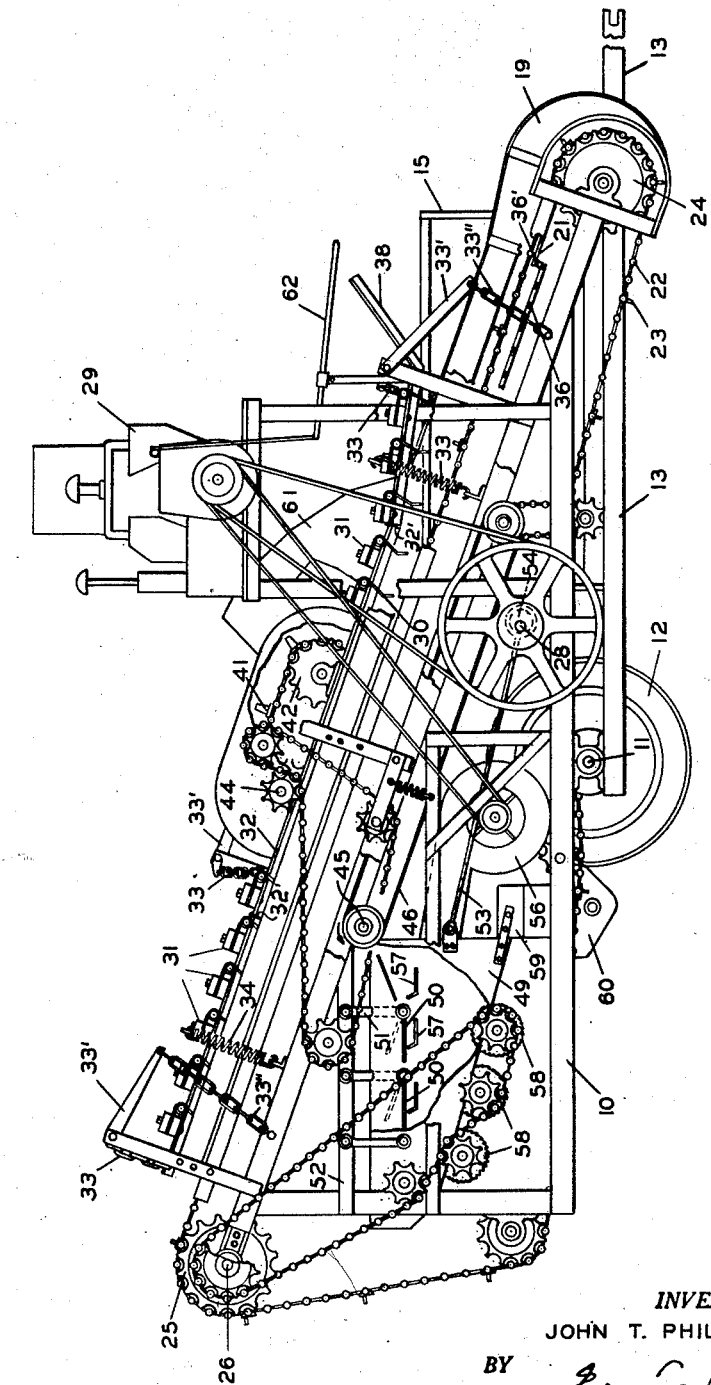
Fig. 1 is a side elevation of a peanut combine according to my invention, with parts broken away and parts in section.

As illustrated in Figs. 1, 7 and 8, I provide agitator mechanism comprising agitator bars 39 disposed transversely over the central section of picker screen 37 with their ends carried by agitator chains 40, each agitator bar being provided with a plurality of agitator pins 41 to pass between or intermeshing with the picker pins 23 of picker bars 20. The agitator chains 40 run over the agitator chain idler sprockets 42, which are mounted on angle bars 32 in the central section of the spring table, and over agitator chain driving sprockets 43 which are mounted on agitator drive shaft 44 which is driven by main drive shaft 28 through intermediate shaft 45. It will be obvious that by suitable choice of gearing the agitator mechanism can be driven at a speed greater than that of the picker bars, or at the same or slower speed if desired. It makes very little difference in what direction the agitator bars are driven so long as there is relative movement of the agitator bars with respect to the picker bars to provide the desired agitation to rearrange the peanut vines. With the arrangement of drive mechanism shown, the movement of the agitator mechanism is in a direction opposed to the movement of the picker bars, but it will be obvious to those skilled in the art that the drive mechanism can be suitably altered to reverse the direction of movement, if desired.

As the vines are pulled along by the picker bars 20, the ground stems are broken from the vines or from the peanuts and the peanuts fall beneath the picker screen where they are caught on conveyor 46 which travels parallel to the picker screen 37 and passes over the conveyor drive roller on shaft 47 and the conveyor idler roller on shaft 48. The conveyor 46 is driven by power conveniently applied to shaft 47 from drive shaft 28. The direction of travel of conveyor 46 is the same as for the picker chains 22 so that the peanuts picked from the vines are conveyed upwardly on the conveyor as the hay continues on a straight incline and finally passes out the rear of the combine.

The conveyor 46 delivers the picked peanuts into the combined separator and stemmer hopper 49. Any foreign material that then remains with the peanuts is caught on separator fingers 50. The hopper 49 is supported upon swing arms 51 carried by the frame member 52 and is connected by pitman 53 with an eccentric 54 on the main drive shaft 28. As the main drive shaft rotates, the hopper 49 is vibrated backwardly and forwardly and swings on arms 51 in an oscillating motion. The fingers 50 are fixed to rods 55 secured to the lower ends of the arms 51 and an upwardly agitating motion is thus imparted to the arms 51 as the hopper 49 swings backwardly and forwardly. The motion of fingers 50 fluffs and throws upward any foreign material delivered to the hopper 49 with the peanuts. Foreign material being thus tossed upwardly and rearwardly by the combined motion of the fingers 50 and the hopper 49 is caught in the air blast from blower 56 and blown out of the rear of the machine. Louvres 57 direct the air blast as desired. Hay falling from the picker bars 20 as the conveyor chains 22 pass over the driving sprockets 25 is also blown clear of the machine by the blast from the blower 56.

In Figs. 5 and 6, an alternate arangement which may be substituted for fingers 50 and rods 55 is shown as comprising a beam 155 which takes the place of each of rods 55 and is secured to the lower end of arms 51. An expanded metal screen 151, fixed to beam 155, is supported at its ends by fingers 150 which extend at right angles from beam 155; thus the same upward agitating motion described above for fingers 50 is imparted to screen 151, the foreign material being blown out of the rear of the machine by an air blast from blower 56. It should be noted that screen 151 is substantially identical in construction with screen 37 as illustrated in Figs. 9, 10 and 11.

The peanuts having been separated and cleaned from foreign material now fall to the inclined bottom of hopper 49 where they pass through the stemmer saw assembly by gravity, aided by the swinging motion of the hopper. The stemmer saws 58 extend through slots (not shown) in the bottom of hopper 49; and as the peanuts pass through the saw assembly, the saws clip off the small stems which may remain on the peanuts, the clipping action being achieved by utilizing the sides of the slots as the stationary jaws. The stems thus cut from the peanuts fall through the slots to the ground, and the peanuts roll into the trough 59 which is inclined toward the left side of the machine and delivers the peanuts to an elevator 60 which raises the peanuts to the discharge end of the elevator shaft 61 where they are sacked. An attendant may stand upon platform 14 while the combine is in motion or while the machine is used in a stationary manner, for it will be apparent that the many improvements in my machine will be advantageous even if the vines are hauled to the machine. In this connection, it is pointed out that manual labor of feeding the machine is greatly reduced by the pick-up end being substantially down upon the ground, and the other operations of the machine performed in the same manner and with the same efficiency as when the machine is used to pick up the vines from the windrow.

The inclined position of the picking screen also has a bearing on the capability of the machine and quality of picking, in that all machines of the carding type rely on gravity to some extent to provide the force which would cause the peanut to swing down through the screen aperture, thus getting the peanut below the screen plane and then pulling or clipping the ground stem off at the rear apex of the aperture. Since my machine has a vertical downward gravitation force acting on the peanut, as well as the linear motion of the peanut passing through the machine, the resultant line of travel of the falling peanut is not straight down, but at a resultant angle between the two lines of force. Therefore, with the picking screen at an angle, the triangular aperture is approximately normal to the resultant line of travel of the peanut, thereby gaining greater effective area from the screen.

As a safety precaution for the moving machine, a safety lever 62 extends from near the forward end of the machine and is connected to the engine 29 to shut it off by striking the bar in the event some body or foreign object should fall into the machine.

It will be obvious to those skilled in the art that many variations may be made in the embodiment shown and described without departing from the scope of my invention as defined by the appended claims.

I claim:

1. A peanut combine comprising a frame mounted for movement over the ground and having a forward nose portion adjacent the ground, picker mechanism including a perforated screen carried by said frame and arranged to form a gradual and continuous incline from said nose portion to the rear of said frame, means carried by said frame for lifting peanut laden vines from a windrow and conveying them over said perforated screen to pick the peanuts from the vines, a hopper mounted at the rear of said frame, a conveyor beneath said perforated screen to catch the picked peanuts and convey them to said hopper, means within said hopper to fluff foreign material delivered to said hopper with the peanuts, means associated with said hopper for directing a blast of air through said hopper to dispose of said foreign material, means in said hopper for removing ground stems from the peanuts, and means associated with said hopper to convey peanuts from said hopper for sacking.

2. A peanut combine comprising a substantially triangular frame mounted for movement over the ground and having a forward nose portion adjacent the ground, picker mechanism including a perforated screen carried by said frame and arranged to form a gradual and continuous incline from said nose portion to the rear of said frame, means carried by said frame for lifting peanut laden vines from a windrow and conveying them over said perforated screen to pick the peanuts from the vines, a hopper mounted for oscillating motion at the rear of said frame, an upwardly inclined conveyor beneath said perforated screen to catch the picked peanuts and convey them upwardly to said hopper, means within said hopper to which an upwardly agitating motion is imparted to fluff foreign material delivered to said hopper with the peanuts, means associated with said hopper for directing a blast of air rearwardly through said hopper to dispose of said foreign material, means in said hopper for removing ground stems from the peanuts, and means associated with said hopper to convey peanuts from said hopper for sacking.

3. A peanut combine comprising a substantially triangular frame mounted for movement over the ground and having a forward nose portion adjacent the ground, picker mechanism including a spring table and a perforated screen carried by said frame and arranged to form a gradual and continuous incline from said nose portion to the rear of said frame, means carried by said frame for lifting peanut laden vines from a windrow and conveying them between said spring table and said perforated screen to pick the peanuts from the vines, a hopper mounted for oscillating motion at the rear of said frame, an upwardly inclined conveyor beneath said perforated screen to catch the picked peanuts and convey them upwardly to said hopper, means within said hopper to which an upwardly agitating motion is imparted to fluff foreign material delivered to said hopper with the peanuts, means associated with said hopper for directing a blast of air rearwardly through said hopper to dispose of said foreign material, means in said hopper for removing ground stems from the peanuts, and means associated with said hopper to convey peanuts from said hopper for sacking.

4. A peanut combine comprising a substantially triangular frame mounted for movement over the ground and having a forward nose portion adjacent the ground, picker mechanism including a spring table and a perforated screen carried by said frame and arranged to form a gradual and continuous incline from said nose portion to the rear of said frame, means carried by said frame for lifting peanut laden vines from a windrow and conveying them between said spring table and said perforated screen to pick the peanuts from the vines, a hopper mounted for oscillating motion at the rear of said frame, an upwardly inclined conveyor beneath said perforated screen to catch the picked peanuts and convey them upwardly to said hopper, means within said hopper to which an upwardly agitating motion is imparted to fluff foreign material delivered to said hopper with the peanuts, means associated with said hopper for directing a blast of air upwardly and rearwardly through said hopper to dispose of said foreign material, means adjacent the bottom of said hopper for removing ground stems from the peanuts, and means associated with said hopper to convey peanuts upwardly from said hopper for sacking.

5. In a peanut combine having a forward nose portion adjacent the ground, a picker screen associated with said portion and arranged to form a continuous incline upwardly from said nose portion, and flexible means extending around said nose portion and around said picker screen and carrying a plurality of picker bars for lifting peanut laden vines from a windrow and conveying them over said picker screen to pick the peanuts from the vines.

6. In a peanut combine, a nose portion arranged to assist in lifting peanut laden vines from the windrow, picker mechanism cooperatively aligned with said nose portion to form a straight line of passage for said vines through said combine, and flexible means carrying a plurality of picker bars extending over said nose portion and through said picker mechanism for moving the vines over said nose portion and through said picker mechanism.

7. In a peanut combine, a forward nose portion adjacent the ground, picker mechanism associated with said portion and arranged to form a continuous incline upwardly from said nose portion, means for lifting peanut laden vines from a windrow and conveying them over said nose portion and through said picking mechanism to pick the peanuts from the vines, and a conveyor positioned beneath said picking mechanism to receive the picked peanuts.

8. In a peanut combine, a frame having a forward nose portion adjacent the ground, picker mechanism carried by said frame and arranged to form an incline upwardly all the way from said nose portion to the rear of said frame, means carried by said frame for lifting peanut laden vines from a windrow and conveying them through said picking mechanism to pick the peanuts from the vines, a hopper mounted on said frame, a conveyor positioned beneath said picking mechanism to convey the picked peanuts to said hopper, and means associated with said hopper for removing ground stems from the peanuts.

9. In a peanut combine, a frame having a forward nose portion adjacent the ground, picker mechanism carried by said frame and arranged to form a continuous incline upwardly from said nose portion to the rear of said frame, means carried by said frame for lifting peanut laden vines from a windrow and conveying them through said picking mechanism to pick the peanuts from the vines, a hopper mounted on said frame, a conveyor positioned beneath said picking mechanism to catch the picked peanuts and conveyor them to said hopper, and means associated with said hopper for removing ground stems from the peanuts.

10. In a peanut combine, a frame having a forward nose portion adjacent the ground, picker mechanism carried by said frame and arranged to form a continuous incline upwardly from said nose portion to the rear of said frame, means carried by said frame for lifting peanut laden vines from a windrow and conveying them through said picking mechanism to pick the peanuts from the vines, a hopper mounted on said frame, a conveyor positioned beneath said picking mechanism to catch the picked peanuts and convey them to said hopper, means associated with said hopper for removing ground stems from the peanuts, and means associated with said hopper to convey peanuts from said hopper for sacking.

11. In a peanut combine, a frame having a forward nose portion adjacent the ground, picker mechanism carried by said frame and arranged to form an incline upwardly from said nose portion to the rear of said frame, means carried by said frame for lifting peanut laden vines from a windrow and conveying them through said mechanism to pick the peanuts from the vine, a hopper mounted on said frame so as to receive the peanuts picked from the vines, and means associated with said hopper for removing ground stems from the peanuts.

12. A peanut combine comprising a frame having a forward nose portion adjacent the ground, picker mechanism carried by said frame and arranged to form an incline upwardly from said nose portion to the rear of said frame, means carried by said frame for lifting peanut laden vines from a windrow and conveying them through said picking mechanism to pick the peanuts from the vines, a hopper mounted on said frame so as to receive the peanuts picked from the vines, means carried by said frame for directing a blast of air rearwardly to dispose of foreign material, means carried by said frame for removing ground stems from the peanuts, and means associated with said hopper to convey peanuts from said hopper for sacking.

13. In a peanut combine having a forward nose portion adjacent the ground, a picker screen associated with said portion and arranged to form a continuous incline upwardly from said nose portion, and flexible means extending around said nose portion and around said picker screen and carrying a plurality of picker bars for lifting peanut laden vines from a windrow and conveying them over said nose portion and said picker screen, said picker screen being spaced downwardly from said nose portion to provide a ledge therebetween.

14. In a peanut combine having a forward nose portion adjacent the ground, a picker screen associated with said portion and arranged to form a continuous incline upwardly from said nose portion, and flexible means extending around said nose portion and around said picker screen and carrying a plurality of picker bars for lifting peanut laden vines from a windrow and conveying them over said picker screen to pick the peanuts from the vines, said picker screen being formed from a piece of material slit and expanded to form substantially diamond shaped openings therethrough.

15. In a peanut combine having a forward nose portion adjacent the ground, a picker screen associated with said portion and arranged to form a continuous incline upwardly from said nose portion, and flexible means extending around said nose portion and around said picker screen and carrying a plurality of picker bars for lifting peanut laden vines from a windrow and conveying them over said picker screen to pick the peanuts from the vines, said picker screen having the characteristics of a screen formed from a piece of metal slit and expanded to form substantially diamond shaped openings therethrough.

16. Apparatus according to claim 15 in which said picker bars ride against said picker screen.

17. In a peanut combine, a nose portion arranged to assist in lifting peanut laden vines from the windrow, picker mechanism cooperatively aligned with said nose portion to form a straight line of passage for said vines through said combine, and flexible means carrying a plurality of picker bars extending over said nose portion and through said picker mechanism for moving the vines over said nose portion and through said picker mechanism, and power driven agitator mechanism positioned above said picker bars and cooperating therewith by relative movement therebetween to agitate said vines.

18. Apparatus according to claim 17 in which said agitator mechanism is driven at a speed greater than the speed of said picker bars.

19. Mechanism according to claim 17 in which movement of said agitator mechanism is in a direction opposite to the movement of said picker bars.

References Cited in the file of this patent
UNITED STATES PATENTS

| | | |
|---|---|---|
| 1,258,354 | Moore | Mar. 5, 1918 |
| 1,917,770 | Moschel | July 11, 1933 |
| 2,214,277 | Hunt et al. | Sept. 10, 1940 |
| 2,620,616 | Deal | Dec. 9, 1952 |